United States Patent [19]

Ittemann et al.

[11] Patent Number: 5,008,364

[45] Date of Patent: Apr. 16, 1991

[54] THERMOPLASTIC MOLDING MATERIALS WHICH ARE STABLE AT HIGH TEMPERTURES AND HAVE IMPROVED MELT STABILITY

[75] Inventors: Peter Ittemann, Ludwigshafen; Georg N. Simon, Limburgerhof; Gerhard Heinz, Weisenheim; Hartmut Zeiner, Plankstadt; Hermann Buchert, Bad Duerkheim; Joachim Seibring, Lambsheim, all of Fed. Rep. of Germany

[73] Assignee: BASF Aktiengesellschaft, Ludwigshafen, Fed. Rep. of Germany

[21] Appl. No.: 209,215

[22] Filed: Jun. 20, 1988

[30] Foreign Application Priority Data

Jun. 27, 1987 [DE] Fed. Rep. of Germany ....... 3721337
Sep. 30, 1987 [DE] Fed. Rep. of Germany ....... 3732931

[51] Int. Cl.$^5$ .................. C08G 8/02; C08G 75/20
[52] U.S. Cl. .................................. 528/172; 528/125; 528/128
[58] Field of Search ............... 528/172, 125, 128

[56] References Cited

U.S. PATENT DOCUMENTS

| | | | |
|---|---|---|---|
| 3,708,454 | 1/1973 | Barlow et al. | 528/125 |
| 3,755,256 | 8/1973 | Beverly | 528/125 |
| 3,875,103 | 4/1975 | Leslie | 528/125 |
| 4,320,224 | 3/1982 | Rose et al. | 528/219 |
| 4,446,294 | 5/1984 | Rose et al. | 528/128 |
| 4,624,997 | 11/1986 | Robeson et al. | 525/471 |
| 4,713,426 | 12/1987 | Harris | 525/471 |

FOREIGN PATENT DOCUMENTS

| | | |
|---|---|---|
| 0113112 | 12/1983 | European Pat. Off. . |
| 0135130 | 8/1984 | European Pat. Off. . |
| 0176988 | 4/1986 | European Pat. Off. . |
| 0176989 | 4/1986 | European Pat. Off. . |
| 0215580 | 8/1986 | European Pat. Off. . |
| 1568548 | 5/1980 | United Kingdom . |

*Primary Examiner*—Morton Foelak
*Assistant Examiner*—P. Hampton Hightower
*Attorney, Agent, or Firm*—Oblon, Spivak, McClelland, Maier & Neustadt

[57] ABSTRACT

Thermoplastic molding materials which are stable at high temperatures and are based on polyaryl ether sulfones and, if required, polyether ketones have a content of alkali metal salts of not more than 100 ppm, based on total polymer.

7 Claims, No Drawings

THERMOPLASTIC MOLDING MATERIALS WHICH ARE STABLE AT HIGH TEMPERTURES AND HAVE IMPROVED MELT STABILITY

The present invention relates to thermoplastic molding materials which are stable at high temperatures and contains, as essential components, (A) from 20 to 100% by weight of a polyaryl ether sulfone consisting of ($A_1$) from 0 to 100 mol % of units of the general formula I

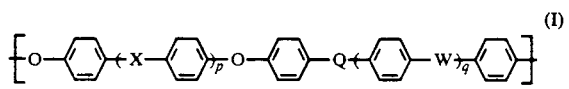

and/or ($A_2$) from 0 to 100 mol % of units of the general formula

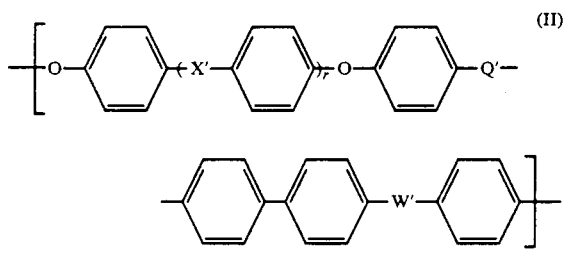

or their $C_1$-$C_6$-alkyl or alkoxy, aryl, chlorine or fluorine derivative which are substituted in the nucleus, where X, X', Q, Q', W and W' independently of one another are each —$SO_2$—, —O—, —CO—, a chemical bond or —CRR'— and in each case or more of the substituents X, Q, W, and X', Q' and W', are —$SO_2$—, R and R' are each hydrogen, $C_1$-$C_6$-alkyl or alkoxy or aryl or their fluorine or chlorine derivatives, and p, q, and r are each 0 or 1, and furthermore (B) from 0 to 80% by weight of a polyaryl ether ketone consisting of ($B_1$) from 0 to 100 mol % of units of the general formula III

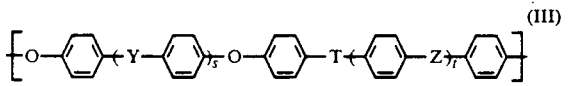

and/or ($B_2$) from 0 to 100 mol % of units of the general formula

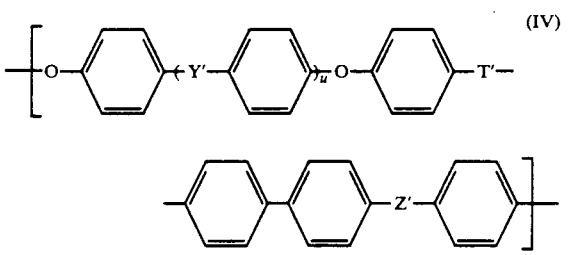

or their $C_1$-$C_6$-alkyl, $C_1$-$C_6$-alkoxy, phenyl, chlorine or fluorine derivatives which are substituted in the nucleus, where Y, Y', T, T', Z and Z' are each —CO—, CR"R'", a chemical bond or —O— and one or more of the substituents Y, T and Z or Y', T' and Z' are —CO—, R" and R'" may have the same meanings as R and R', and s, t and u are each 0 or 1, and (C) from 0 to 90% by weight of fibrous or particulate fillers or a mixture of these.

Because of their good physical and thermal properties, polyaryl ether sulfones have become more and more interesting over the past few years for many different purposes. Because of their high melting points, temperatures of 370° C. or higher are required for processing the polyaryl ether sulfones by a thermoplastic method.

At such high temperatures, the non-stabilized polymers show a tendency to decompose, which manifests itself in a considerable increase in the melt viscosity or in a dark coloration, unless certain measures are taken to stabilize the polymer.

In German Laid-Open Application DOS 2,211,807, 0.01–4% by weight of a phosphorus compound are added to polyaryl ether sulfones for heat stabilization. According to the Examples, this reduces the increase in melt viscosity by a factor of about 2. However, this is not always sufficient for some intended uses.

Furthermore, German Laid-Open Application DOS 2,221,969 describes heat-stabilized polyaryl ether sulfones which, in addition to 2–40% by weight of asbestos or titanium dioxide, also contain 0.2–15% by weight of a divalent metal oxide or sulfide which does not react with water to form the corresponding hydroxide.

However, the addition of such large amounts of fillers and metal compounds to polyaryl ether sulfones has extremely adverse effects on the transparency of molding materials produced therefrom. This is unacceptable for many intended uses.

Because of their good heat distortion resistance, polyaryl ether sulfones are also used in the medical sector. In this sector, the articles produced therefrom have to be capable of being repeatedly sterilized at, for example, 140° C. in a water bath (under superatmospheric pressure) without the transparency or the mechanical properties suffering as a result. This criterion is not fulfilled by commercial polyaryl ether sulfones which have not been stabilized (cf. N. Krollmann, Conference on plastics stable at high temperatures, on Dec. 12 and 13, 1985, Conference Report page 67).

Another application of polyaryl ether sulfones is in the form of pipes for conveying steam (district heating networks) or other hot media. It is therefore desirable for the mechanical properties to be maintained even under conditions of high internal pressure in conjunction with elevated temperatures.

It is an object of the present invention to provide thermoplastic molding materials which are stable at high temperatures and which, in addition to polyaryl ether sulfones as the essential component, may furthermore contain polyaryl ether ketones and fillers and which possess a stable melt viscosity at 400° C. or higher and good stability under stress over prolonged periods at elevated temperatures and superatmospheric pressure (both internal and external pressure).

We have found that this object is achieved by the thermoplastic molding materials stable at high temperatures and defined at the outset, which materials contain not more than 100 ppm, based on total polymer and calculated as alkali metal, of an alkali metal salt.

The novel molding materials are stable for prolonged periods at 400° C. and show no significant increase in the melt viscosity. Moreover, they can be stored for a prolonged period even at elevated temperatures under atmospheric or superatmospheric pressure without the performance characteristics, in particular the transparency and the mechanical properties, being significantly adversely affected.

The novel thermoplastic molding materials stable at high temperatures contain, as component A, from 20 to 100, preferably from 60 to 100, in particular from 70 to 95, mol %, based on the sum of A and B, of one or more polyaryl ether sulfones having repeating units of the general formulae I and/or II chlorine or fluorine derivatives or chlorine or fluorine itself. Examples are methyl, ethyl, isopropyl and n-propyl, the corresponding alkoxy groups and $CF_3$. Preferred substituents are hydrogen, methyl, phenyl and trifluoromethyl.

The parameters p, q and r may each be 0 or 1.

In polyaryl ether sulfones which possess both units of the formula I and those of the formula II, the units of the formulae I and II may be randomly distributed or in block form.

The number average molecular weight $\overline{M}_n$ of the polyaryl ether sulfones A is in general from 2,000 to 200,000, preferably from 5,000 to 100,000, in particular from 6,000 to 70,000.

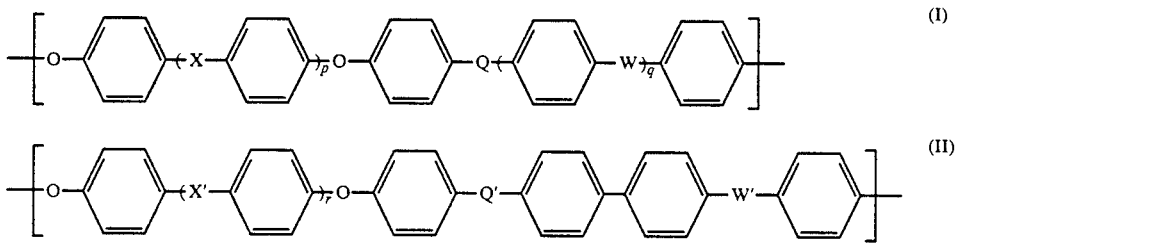

or their $C_1$-$C_6$-alkyl or alkoxy, aryl, chlorine or fluorine derivatives which are substituted in the nucleus.

The substituents X, X', Q, Q', W and W' may each be —$SO_2$—, —CO—, —O—, a chemical bond or CRR'; in each case, one or more of the substituents X, Q or W are an —$SO_2$— group.

The same applies to the substituents X', Q' and W', i.e. one or more of these substituents too are a —$SO_2$— group. R and R' in the substituent —CRR'— are each hydrogen, $C_1$-$C_6$-alkyl, $C_1$-$C_6$-alkoxy, aryl or their The amount of the units I and/or II is not subject to any restriction, i.e. it may be from 0 to 100 mol % in each case. In the latter case, the polyaryl ether sulfones A consist of only one repeating unit. Preferably, the polyaryl ether sulfones A consist of from 5 to 95, in particular from 15 to 85, mol % of units of the formula I and from 5 to 95, in particular from 15 to 85, mol % of units of the formula II. Examples of units of the general formulae I and II are:

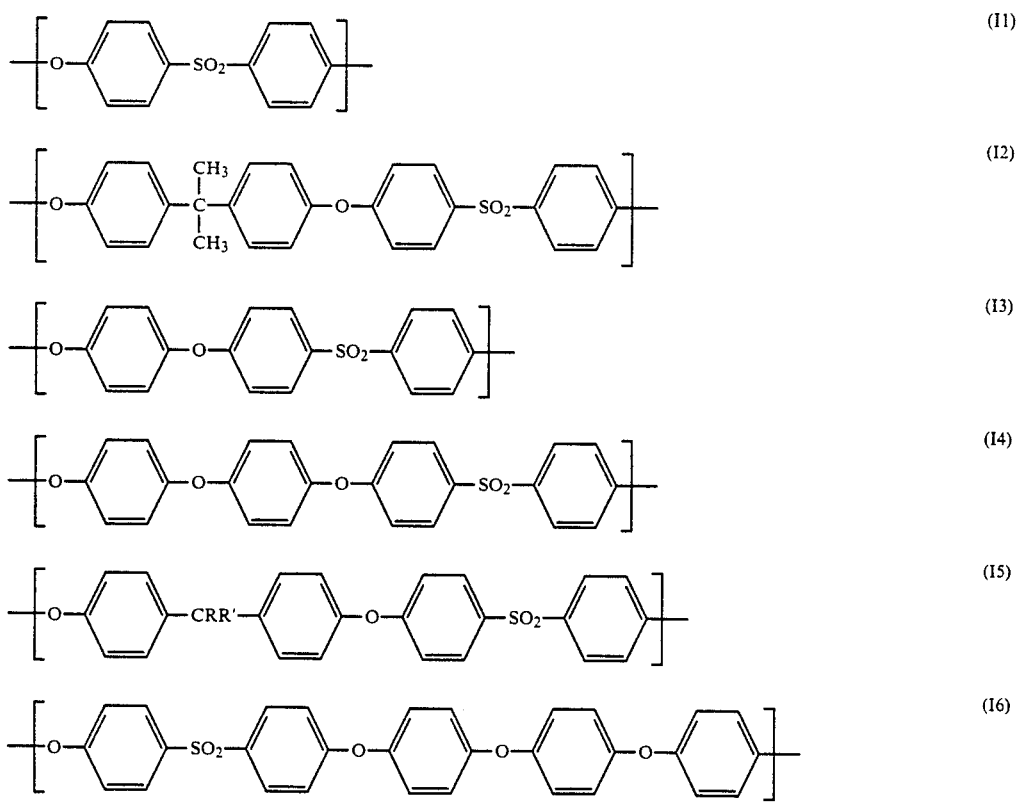

-continued

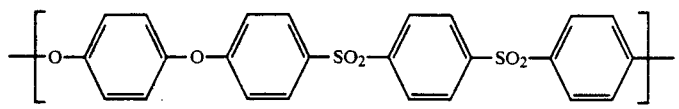

(I7)

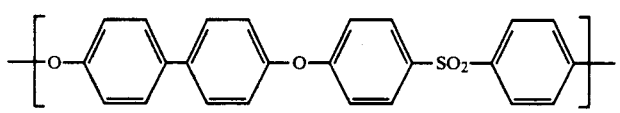

(I8)

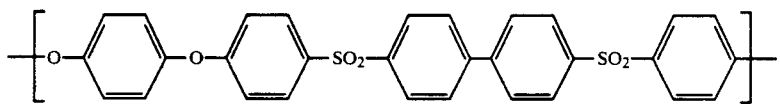

(II1)

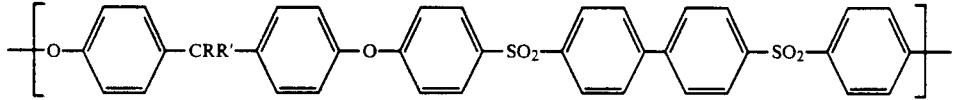

(II2)

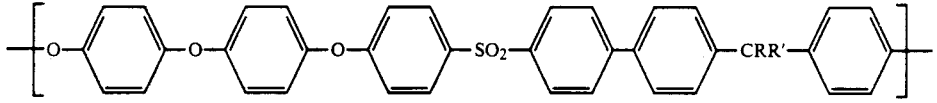

(II3)

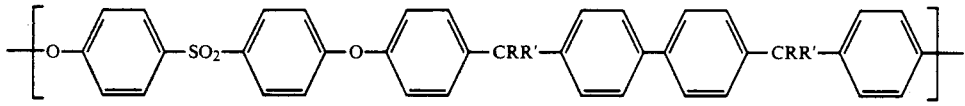

(II4)

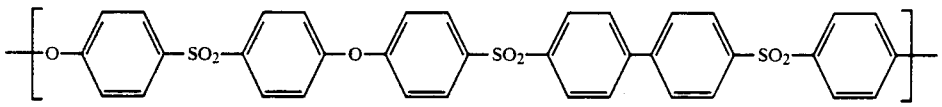

(II5)

the selection being merely typical of the units falling under the general formulae I and II. The above examples can be described as follows in terms of the substituents X, Q, W or X', Q' and W' and the parameters p, q and r:

|     | P | q | X         | Q       | W       |
|-----|---|---|-----------|---------|---------|
| I1  | 1 | 0 | —SO₂—     | SO₂     | —       |
| I2  | 1 | 0 | —C(CH₃)₂— | —SO₂—   | —       |
| I3  | 0 | 0 | —         | —SO₂—   | —       |
| I4  | 1 | 0 | —O—       | —SO₂—   | —       |
| I5  | 1 | 0 | —CRR'—    | —CO₂—   | —       |
| I6  | 1 | 1 | —SO₂—     | —O—     | —O—     |
| I7  | 0 | 1 | —         | —SO₂—   | —SO₂—   |
| I8  | 1 | 0 | chem. bond| —SO₂—   | —       |
|     | r |   | X'        | Q'      | W'      |
| II1 | 0 |   | —         | —SO₂—   | —SO₂—   |
| II2 | 1 |   | —CRR'—    | —SO₂—   | —SO₂—   |
| II3 | 1 |   | —O—       | —SO₂—   | —CRR'—  |
| II4 | 1 |   | —SO₂—     | —CRR'—  | —CRR'—  |
| II5 | 1 |   | —SO₂—     | —SO₂—   | —SO₂—   |

Although, as stated above, any combinations of the substituents X, Q and W or X', Q' and W' are in principle possible, preferred units are in general those in which Q and W or Q' and W' are identical, since the corresponding monomers are as a rule more readily obtainable.

Particularly preferred components A are polyaryl ether sulfones which possess from 50 to 100 mol % of repeating units of the formulae I1, I2 and II5.

The component A may furthermore contain a plurality of different units of the general formula I or different units of the general formula II, i.e. it may be a random or block copolymer of different units of the general formula I or of the general formula II.

The polyaryl ether ketones of the general formulae III and/or IV, which may be present as component B in the novel thermoplastic molding materials, account for from 0 to 80, preferably from 0 to 40, in particular from 5 to 30, % by weight, based on the sum of the components A and B.

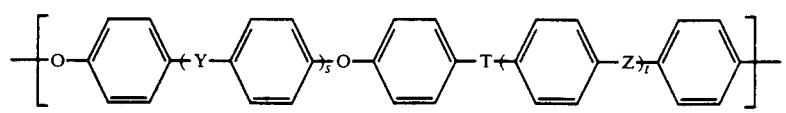

(III)

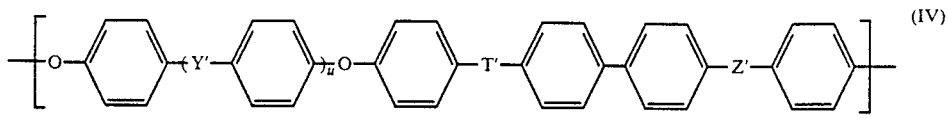

As in the case of component A, the units of the formulae III and/or IV may furthermore be substituted by $C_1$–$C_6$-aryl, $C_1$–$C_6$-alkoxy or phenyl or their chlorine or fluorine derivatives or chlorine or fluorine in the aromatic nucleus.

The substituents Y, Y', T, T', Z and Z' may each be —CO—, —CR"R"'—, a chemical bond or —O—, with the proviso that one or more of the substituents Y, T and Z or Y', T' and Z' are a —CO—group.

s, t and n are each 0 or 1.

The polyether ketones B may consist of units of the formula III or units of the formula IV or of units of both formulae; in the latter case, the units $B_1$ and $B_2$ are either randomly distributed or arranged in the form of blocks. The amount of units $B_1$ and $B_2$ in the polyether ketones B is not subject to any restriction and may be from 0 to 100 mol %. Preferred polyether ketones are those which consist of from 5 to 95, in particular from 15 to 85, mol % of $B_1$ and correspondingly from 5 to 95, in particular from 15 to 85, mol % of B2.

The number average molecular weight of polyether ketones B is in general from 2,000 to 150,000, preferably from 4,000 to 70,000.

Examples of units of the formulae III and IV are those in which, in the abovementioned examples of the units I and II, the —$SO_2$—groups are each replaced by —CO—.

These units may be described by the parameters T, T', Y, Y', Z, Z', s, t and n, similarly to the examples of the units I and II, by replacing each —$SO_2$— by —CO—.

Typical examples of dihydroxy and dihalogen compounds which may be used for the preparation of the polyaryl ether sulfones or polyether ketones in the novel molding materials are: Dihydroxy compounds

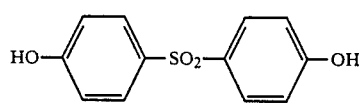

4,4'-dihydroxyphenyl sulfone

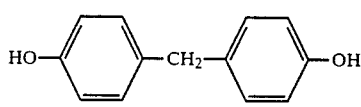

di-(4-hydroxyphenyl)-methane

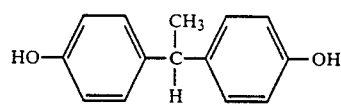

2,2-di-(4-hydroxyphenyl)-ethane

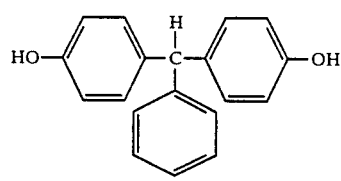

1-phenyl-1,1-di-(4-hydroxyphenyl)-methane

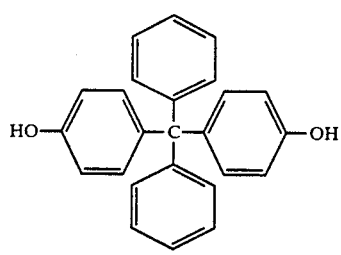

diphenyl-di-(4-hydroxyphenyl)-methane

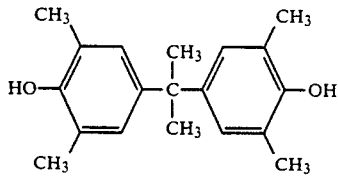

tetramethylbisphenol A

-continued

| Structure | Name |
|---|---|
| HO—⌬—O—⌬—OH | 4,4'-dihydroxydiphenyl ether |
| HO—⌬—S—⌬—OH | 4,4'-dihydroxydiphenyl sulfide |
| HO—⌬—C(=O)—⌬—OH | 4,4-dihydroxybenzophenone |
| HO—⌬—C(CH$_3$)$_2$—⌬—OH | bisphenol A |
| HO—⌬—C(=O)—⌬—C(=O)—⌬—OH | 1,4-di-(4-hydroxybenzoyl)-benzene |
| HO—⌬(CH$_3$)$_2$—SO$_2$—⌬(CH$_3$)$_2$—OH | 3,3',5,5'-tetramethyl-4,4'-dihydroxydiphenyl sulfone |
| HO—⌬—OH | hydroquinone |
| 2,3,6-trimethyl substituted hydroquinone | 2,3,6-trimethylhydroquinone |
| HO—⌬—⌬—OH | 4,4'-dihydroxydiphenyl |
| HO—⌬(CH$_3$)$_2$—⌬(CH$_3$)$_2$—OH | 3,3',5,5'-tetramethyl-4,4'-dihydroxydiphenyl |
| HO—⌬—C(=O)—⌬—O—⌬—C(=O)—⌬—OH | dihydroxybenzophenone ether |

Among the abovementioned, dihydroxy compounds, 4,4'-dihydroxydiphenyl, 3,3',5,5'-tetramethyl-4,4'-dihydroxydiphenyl, bisphenol A, tetramethylbisphenol A, 4,4'-dihydroxydiphenyl sulfone and 2,3,6-trimethylhydroquinone are particularly preferred.

Dihalogen Compounds

| Structure | Name of the chlorine compound |
|---|---|
| 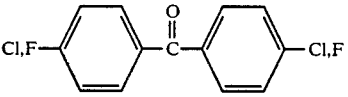 | 4,4'-dichlorobenzophenone |
| 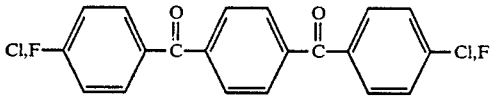 | 1,4-di-(4-chlorobenzoyl)-benzene |
| 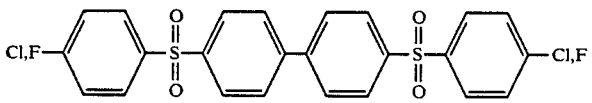 | 4,4'-di-(4-chlorophenyl-sulfonyl)-diphenyl |
| 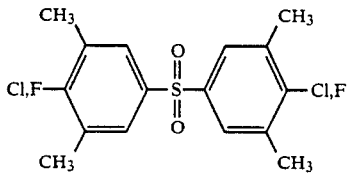 | 3,3'-5,5'-tetramethyl-4,4'-dichlorodiphenyl sulfone |
| 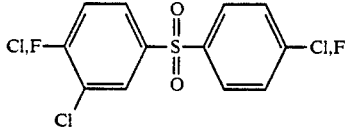 | 3'-chloro-4,4'-dichlorodiphenyl sulfone |
| 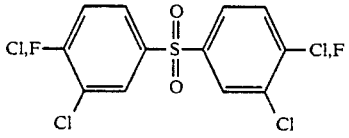 | 3,3'-4,4'-tetrachlorodiphenyl sulfone |
| 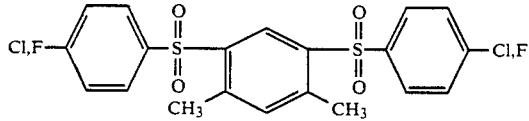 | 1,5-dimethyl-2,4-di-(4'-chlorophenylsulfonyl)-benzene |

Among the abovementioned dihalogen compounds, 3,3',5,5'-tetramethyl-4,4'-dichlorodiphenyl sulfone, 4,4-di-(4-chlorophenylsulfonyl)-diphenyl and 1,5-dimethyl-2,4-di-(4'-chlorophenylsulfonyl)-benzene, and the corresponding compounds in which the —SO$_2$— group is replaced by the —CO— group, are particularly preferred.

Typical examples of monomers having biphenyl units, which are used for the preparation of polymers possessing repeating units of the formulae II and IV, are:

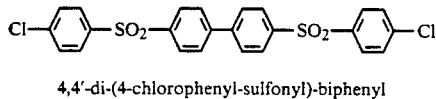

4,4'-di-(4-chlorophenyl-sulfonyl)-biphenyl

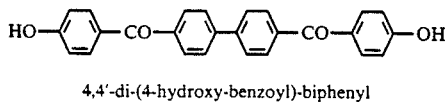

4,4'-di-(4-hydroxy-benzoyl)-biphenyl and in principle compounds which have a similar structure and in which the —SO$_2$— or —CO— groups are replaced by other groups (—O— or —CRR'—).

Provided that the preconditions of claim 1 are satisfied, the abovementioned compounds can in principle be reacted with one another in any combination.

The novel molding materials may contain, as component C, 0–90, preferably 2–45, in particular 5–40, % by weight of fibrous or particulate fillers or a mixture of these.

Examples of reinforcing fillers are asbestos, carbon and preferably glass fibers, the glass fibers being used, for example, in the form of woven glass fabrics, glass mats, surfacing mats and/or, preferably glass rovings and chopped glass strands of low-alkali E glass which have a diameter of from 5 to 20 μm, preferably from 8 to 15 μm, and which, after they have been incorporated, have a mean length of from 0.05 to 1 mm, preferably from 0.1 to 0.5 mm. The molding materials reinforced with glass rovings or chopped glass strands contain from 10 to 60, preferably from 20 to 50, % by weight, based on the total weight, of the reinforcing agent, while the impregnated glass fabric, glass mats and/or surfacing mats contain from 10 to 80, preferably from 30 to 60, % by weight, based on the total weight, of the thermoplastic molding material stable at high temperatures.

Wollastonite, calcium carbonate, glass spheres, powdered quartz and boron nitride or mixtures of these fillers may also be used.

Furthermore, pigments, additives and assistants may also be employed, usually in amounts of from 0.01 to 3% by weight, based on the weight of polyaryl ether sulfones and/or polyaryl ether ketones.

Examples of suitable pigments are titanium dioxide, cadmium sulfide, zinc sulfide, barium sulfate and carbon black. Other suitable additives and assistants are, for example, dyes, lubricants, e.g. graphite or molybdenum disulfide, abrasives, e.g. carborundum, light stabilizers and hydrolysis stabilizers.

The copolycondensates may furthermore be mixed with other thermoplastics, for example polyesters, polyamides, polyurethanes, polyolefins, polyvinyl chloride and polyoxymethylenes, in amounts of from 5 to 60, preferably from 20 to 50, % by weight, based on the molding materials.

The novel molding materials may be prepared by a conventional process for the preparation of polyaryl ether sulfones or polyaryl ether ketones, as described in the literature.

The process conditions, such as temperature, pressure, suitable solvents and any additives (catalysts) are the same as those described in EP-A 113 112 and EP-A 135 130, so that further information is superfluous here.

Reaction in aprotic polar solvents in the presence of anhydrous alkali metal carbonates as catalysts is particularly suitable. A particularly preferred combination is N-methylpyrrolidone as solvent and $K_2CO_3$ as a base. In the preparation of the polyether ketones, diphenyl sulfone is as a rule used as a solvent, because of the relatively high reaction temperatures required.

The amount of solvent is in general from 5 to 100, preferably from 5 to 20, moles per mole of monomer. This gives a preferred solids content of the reaction solution of from 5 to 50, particularly preferably from 10 to 40, % by weight.

The water formed during the polycondensation can be removed with the aid of an azeotrope former, by means of reduced pressure or, preferably, by passing in a stream of nitrogen and distillation.

Suitable azeotrope formers are all compounds which boil in the region of the reaction temperature under atmospheric pressure and can be mixed homogeneously with the reaction mixture without undergoing chemical reactions.

The reaction temperature during the preparation of the polyaryl ether sulfones is in general from 130° to 220° C., preferably from 150° to 210° C.; the total reaction time depends on the desired degree of condensation but is in general from 0.1 to 15 hours.

In the preparation of the polyether ketones B, higher temperatures of from 150° to 400° C., in particular from 200° to 350° C., are generally required.

After the polycondensation, stabilization may be effected by reacting free terminal phenolate groups with an arylating or alkylating agent, e.g. methyl chloride. This is preferably carried out at 50°-200° C., preferably 50°-150° C.

Owing to the alkali metal carbonates which are used as a base in the condensation and which are converted into alkali metal halides in the course of the reaction, the polyaryl ether sulfones or polyether ketones have alkali metal salt contents which are well above 100 ppm and are therefore unsuitable for the preparation of the novel molding materials.

To separate off the alkali metal halide, which is generally suspended in the reaction solution, it is basically possible to use suitable separation apparatuses, for example clarifying filters or centrifuges.

On the other hand, it is also possible for the products obtained to be treated several times with water or with mixtures of organic solvents which permit extraction of the alkali metal halide. A suitable mixture of this type is, for example, a methanol/acetone mixture.

In any case, it is important that the filtration or centrifuging or the extraction be carried out until the alkali metal content of the novel molding material is not more than 100 ppm, preferably less than 80 ppm, in particular less than 60 ppm, based on total polymer.

It has proven particularly advantageous to reduce the content of alkali metal as much as possible, i.e. the lower the salt content the more advantageous are, as a rule, the properties. Contents of not more than 10, in particular not more than 8, ppm are therefore desirable.

The content of alkali metals can be determined by methods which are known per se and described in the literature.

The further working up of the substantially alkali metal-free polyaryl ether sulfones or polyaryl ether ketones can be carried out in a conventional manner, for example by evaporating the solvent or precipitating the polymer in a suitable nonsolvent. Such processes are familiar to the skilled worker.

The novel thermoplastic molding materials possess good heat distortion resistance, in particular good melt stability, even at 400° C. Furthermore, the molding materials can be subjected several times to sterilization with superheated steam under superatmospheric pressure and at elevated temperatures without the mechanical properties and, where it is present from the outset, the transparency of the molding materials being adversely affected. The novel molding materials even withstand prolonged storage at elevated temperatures under internal pressure in water without significant deterioration of the mechanical properties.

Because of this property spectrum, the novel thermoplastic molding materials are particularly suitable for the production of moldings which are subjected to high temperatures, for use in the medical sector, in food packaging and for use in composite materials.

EXAMPLE 1

Preparation of Polyether Sulfone Having Repeating Units of the General Formula I1 and Containing Less than 10 ppm of potassium.

In a 50 l kettle, 7,753 g (27 moles) of 4,4'-dichlorodiphenyl sulfone, 6,757 g (27 moles) of 4,4'-dihydroxydiphenyl sulfone and 4,104 g (29.7 moles) of potassium carbonate in 30 l of N-methylpyrrolidone were heated to 190° C. while a strong stream of nitrogen was passed in. After a reaction time of 8 hours, unconverted potassium carbonate and potassium chloride formed were filtered off over a pressure filter, and the filtrate was precipitated in water. After the polymer had been extracted with water to a residual potassium content in the polymer of <10 ppm, the polymer powder was pressed out, dried, extruded at 300° C. in an extruder, and the extrudates were granulated. The solution viscosity of the granules was 68 ml/g (measured on a 0.5% strength solution in 1:1 phenol/o-dichlorobenzene at 25° C.). Standard small bars measuring 50×6×4 mm were injection molded from these granules, according to DIN 53,451 (melt temperature: 350° C., mold temperature 150° C.).

Storage in Water

The standard small bars produced above were stored in water in a pressure kettle at 140° C. under superatmospheric pressure. After 10 days (=240 hours) and 20 days (=480 hours), the standard small bars were removed and were stored temporarily in a vessel containing water until they had reached the temperature of the test room, which had the standard conditions of 23/50-2 (DIN 50,014). Thereafter, the samples were dried off with absorptive paper, and the measurements were carried out immediately.

For comparison, Victrex® 3600 G (polyaryl ether sulfone having repeating units of the formula I1 from ICI) was subjected to the same tests.

The mechanical properties were investigated

| Yield point | DIN 53,455 |
| Elongation at yield point | DIN 53,455 |
| Tensile strength | DIN 53,455 |
| Elongation at tensile strength | DIN 53,455 |
| Ultimate tensile strength | DIN 53,455 |
| Elongation at break | DIN 53,455 |
| Impact strength | DIN 53,453 |

The results of the measurements are shown in the Table below.

TABLE

| Test | DIN | Unit | Comparison | | | Example 1 | | |
|---|---|---|---|---|---|---|---|---|
| Potassium content | | ppm | 150 | | | 3 | | |
| Storage time in water at 140° C. | | days | 0 | 10 | 20 | 0 | 10 | 20 |
| Yield point | 53,455 | N/mm² | 88.49 | 97.56 | — | 86.2 | 100.16 | 78.8 |
| Elongation at yield point | 53,455 | % | 6.7 | 6.0 | — | 6.7 | 5.9 | 4.0 |
| Tensile strength | 53,455 | N/mm² | 88.5 | 86.2 | 14.83 | 86.3 | 97.11 | 78.5 |
| Elongation at Fmax | 53,455 | % | 6.6 | 4.7 | 0.83 | 6.8 | 5.9 | 3.9 |
| Ultimate tensile strength | 53,455 | N/mm² | 53.77 | 81.4 | 14.82 | 61.0 | 87.6 | 64.7 |
| Elongation at break | 53,455 | % | 15.0 | 4.8 | 0.83 | 30.3 | 6.2 | 4.7 |
| Impact strength (23° C.) | 53,453 | kj/m² | No fracture | 73.8 | 24.1 | No fracture | 108.1 | 113.5 |

The results show clearly that the mechanical properties of the novel polyaryl ether sulfones are substantially less adversely affected than those of the comparison product by storage in water at 140° C. Furthermore, the novel polyaryl ether sulfone was still transparent after storage in water for 20 days, whereas the comparison product had a pronounced milky cloudiness.

We claim:

1. A thermoplastic molding material which is stable at high temperatures and contains, an essential components, (A) from 20 to 100% by weight of a polyaryl ether sulfone consisting of (A₁) from 0 to 100 mol % of units of the formula I

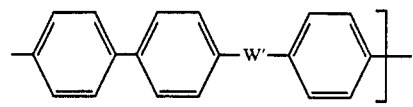

and (A₂) from 0 to 100 mol % of units of the formula II

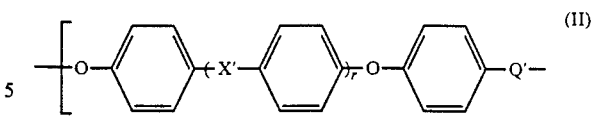

or their $C_1$-$C_6$-alkyl or alkoxy, aryl, chlorine or fluorine derivatives which are substituted in the nucleus, where X, X', Q, Q', W and W' independently of one another are each —SO₂—, —O—, —CO—, a chemical bond or —CRR'— and in each case one or more of the substituents X, Q, W and X', Q, and W' are —SO₂—, R and R' are each hydrogen, $C_1$-$C_6$-alkyl or alkoxy, aryl or their fluorine or chlorine derivatives, and p, q and r are each 0 or 1, and furthermore (B) from 0 to 80% by weight of a polyaryl ether ketone consisting of (B₁) from 0 to 100 mol % of units of the formula III

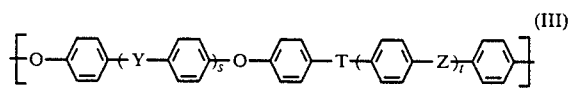

and (B₂) from 0 to 100 mol % of units of the formula

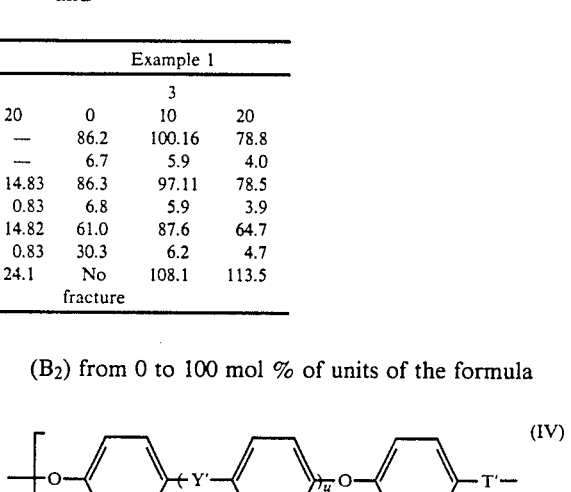

or their $C_1$-$C_6$-alkyl, $C_1$-$C_6$-alkoxy, phenyl, chlorine or fluorine derivatives which are substituted in the nucleus, where Y, Y', T, T', Z and Z' are each —CO—, CR"R"', a chemical bond or —O— and one or more of the substituents Y, T, and Z or Y', T' and Z' are —CO—, R" and R"' may have the same meanings as R and R', and s, t and u are each 0 or 1, and (C) from 0 to 90% by weight of fibrous or particulate fillers or a mixture of these, wherein the said molding material contains not more than 100 ppm, based on total polymer and calculated as alkali metal, of an alkali metal salt as obtained by polycondensation of the respective precursor monomers in an aprotic polar solvent in the presence of an alkali metal carbonate, followed by filtration over a pressure filter and precipitation in water and extraction of the precipitated polycondensation product forming a powder with water until a residual alkali metal content of less than 100 ppm is obtained.

2. A thermoplastic molding material which is stable at high temperatures, as claimed in claim 1, wherein the alkali metal content is not more than 10 ppm, based on total polymer.

3. A thermoplastic molding material which is stable at high temperatures, as claimed in claim 1, wherein the component A contains 50–100 mol % of repeating units of the formula I1

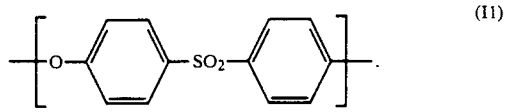

4. A thermoplastic molding material which is stable at high temperatures, as claimed in claim 1, wherein the component A contains 50–100 mol % of repeating units of the formula

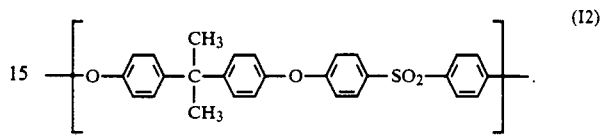

5. A thermoplastic molding material which is stable at high temperatures, as claimed in claim 1, wherein the component A contains 50–100 mol % of repeating units of the formula

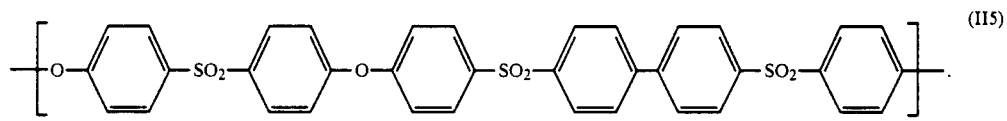

6. A molding containing, as an essential component, a thermoplastic molding material which is stable at high temperatures, as claimed in claim 1.

7. The thermoplastic molding material of claim 1, wherein said aprotic solvent is N-methylpyrrolidone and said alkali metal carbonate is $K_2CO_3$.

* * * * *